B. M. W. HANSON.
BALL BEARING.
APPLICATION FILED JAN. 16, 1920.
1,399,959.  Patented Dec. 13, 1921.
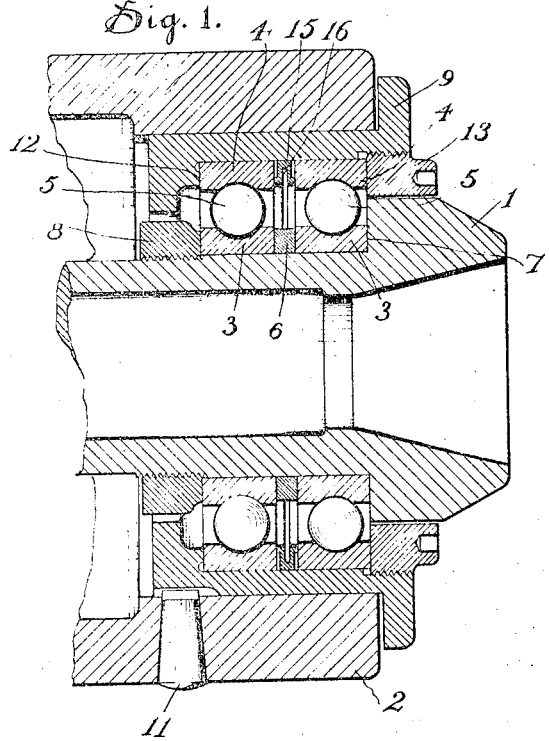
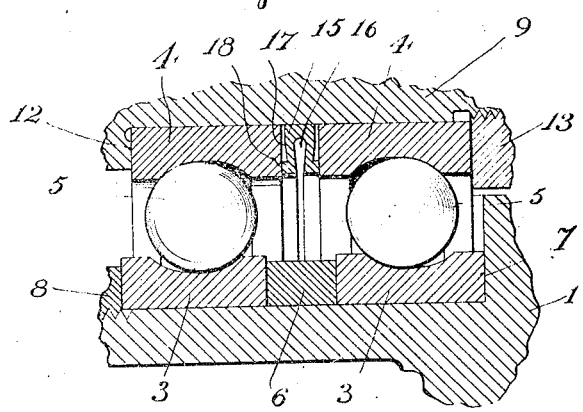
Inventor
Bengt M. W. Hanson
H. E. Hart
His Attorney

UNITED STATES PATENT OFFICE.

BENGT M. W. HANSON, OF HARTFORD, CONNECTICUT.

BALL-BEARING.

1,399,959.  Specification of Letters Patent.  Patented Dec. 13, 1921.

Application filed January 16, 1920. Serial No. 351,800.

*To all whom it may concern:*

Be it known that I, BENGT M. W. HANSON, a citizen of the United States, and a resident of Hartford, county of Hartford, State of Connecticut, have invented certain new and useful Improvements in Ball-Bearings, of which the following is a specification.

This invention relates to ball bearings and has as its aim to provide an improved and efficient construction wherein wear between the parts may be taken up and the parts thus maintained in proper operative relation.

In the accompanying drawing, I have shown but one embodiment of my invention but it is to be understood that the present disclosure is by way of illustration only and it is not to be taken as restrictive.

In describing the embodiment of the invention herein illustrated, conventional terms will be used but it is to be understood that they are used solely for the purposes of description and they are not to be taken as having any limiting effect.

In the accompanying drawing:

Figure 1 is a central longitudinal section of an arrangement in which the present invention is incorporated, and Fig. 2 is an enlarged detail view showing in section the position of the parts after they have been adjusted because of wear.

In the embodiment illustrated in the drawing, 1 designates a spindle, and 2 a housing, one of these members being rotary and the other stationary, in the present instance the spindle being the bearing supported or rotary member. Between the spindle and housing are a pair of ball bearing units, each having an inner ring 3, an outer ring 4 and interposed anti-friction balls 5. The inner rings 3 are spaced apart by a washer 6 and are fixed between a shoulder or abutment 7 on the spindle 1 and an adjustable nut 8 threaded on the spindle. The outer rings 4 fit snugly within a cylindrical sleeve 9 positioned in the housing or casing 2. A key 11 prevents rotation of the sleeve 9 while admitting of longitudinal adjustment thereof within the housing. The outer rings 4 are positioned between a shoulder or abutment 12 on the sleeve 9 and a nut 13 threaded in the outer end of the sleeve.

In accordance with the present invention, there is provided between the corresponding rings of the bearing units, in the present instance between the outer rings 4 thereof, a resilient spacing member having features of novelty and advantage. This spacing member, designated generally by the numeral 15, comprises generally a ring having radially extending resilient side members, the distance between the outer faces of which at their free edges is greater than the width of the ring. In the present illustrative disclosure this ring, which is formed of a stiff resilient metal, such as steel, has in its inner periphery a channel or groove 16 forming at either side of the ring resilient walls 17. On the outer face of each wall and adjacent the free edge thereof is a small annular rib 18 and these ribs are adapted to abut against the opposed faces of corresponding rings of the bearing units, in the present case the outer rings 4.

It will be seen that when wear takes place in the bearings, the nut 13 may be turned so that it will move into the sleeve and the sleeve will move outwardly of the housing 2 and thus the rings 4 are drawn toward each other and the spacing member 15 is compressed as shown in Fig. 2. In the event the spindle is subjected to endwise shocks, the spacing member, owing to the resiliency of the flanges 16, will take up these shocks and thereby relieve the bearings.

In accordance with the provisions of the patent statutes, I have described the principle of operation of my invention together with the arrangement which I now consider to be the best embodiment thereof but it is to be understood that the arrangement shown is only illustrative and my invention is susceptible of various modifications and changes.

I claim as my invention:—

1. In combination, a pair of bearing units each having an outer ring, an inner ring and anti-friction balls; a compressible spacing member between corresponding rings of said units, and means for adjusting said corresponding rings relative to one another.

2. In combination, a pair of bearing units each having an outer ring, an inner ring and anti-friction balls; a resilient spacing member between corresponding rings of said units, and means for adjusting the rings between which said member is interposed relative to each other and to their respective coöperating rings.

3. In combination, a pair of bearing units each having an outer ring, an inner ring and anti-friction balls; a spacing member between corresponding rings of said bearing units and comprising a ring provided at each side with resilient members engaging the opposed faces of said corresponding rings; and means for adjusting said corresponding rings of said bearing units relative to one another.

4. In combination, a stationary member and a rotary member one within the other; an element keyed to one of said members for relative longitudinal movement and having a pair of spaced abutments one adjustable relative to the other, a pair of ball bearing units including a pair of rings interposed between said abutments, and a compressible spacer between said rings.

5. In combination, a housing; a sleeve keyed therein for longitudinal movement and having a pair of spaced abutments one of which is adjustable relative to the other; a spindle extending through said sleeve; a pair of ball bearing units interposed between said sleeve and spindle and each including an outer ring carried by said sleeve between said abutments, an inner ring on said spindle and anti-friction balls between the inner and outer ring; and a resilient spacing member between the outer rings.

BENGT M. W. HANSON.